US006510235B1

United States Patent
Shin et al.

(10) Patent No.: US 6,510,235 B1
(45) Date of Patent: Jan. 21, 2003

(54) METHOD OF STORING DATA IN AND SEARCHING THROUGH AN ELECTRONIC PHONE NUMBER DATA BOOK IN A DIGITAL MOBILE PHONE WITH CHARACTER RECOGNITION FUNCTION

(75) Inventors: Jang-Ki Shin, Yongin-shi (KR); Joung-Kyou Park, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/420,271

(22) Filed: Oct. 18, 1999

(30) Foreign Application Priority Data

Oct. 17, 1998 (KR) .............................. 98-43540

(51) Int. Cl.[7] .................................................. G06K 9/00
(52) U.S. Cl. ......................................... 382/100; 382/189
(58) Field of Search ............................... 382/100, 181, 382/187, 189, 229; 455/550

(56) References Cited

U.S. PATENT DOCUMENTS 4,972,496 A * 11/1990 Sklarew ..................... 345/178
5,526,411 A * 6/1996 Krieter ................... 379/110.01
5,959,260 A * 9/1999 Hoghooghi et al. ...... 178/18.03
6,289,213 B1 * 9/2001 Flint et al. .................. 455/420
6,295,372 B1 * 9/2001 Hawkins et al. ............ 345/156

FOREIGN PATENT DOCUMENTS

GB 2329300 A * 3/1999
JP 10164205 A * 6/1998

* cited by examiner

*Primary Examiner*—Jon Chang
(74) *Attorney, Agent, or Firm*—Dilworth & Barrese, LLP

(57) ABSTRACT

A method of storing data in an electronic phone data book for a digital mobile phone, which includes a key input part, display, touch screen for inputting characters, character code storage for storing character and number codes, character database for storing feature data corresponding to character and number codes, and character recognition device. A method of searching through the electronic phone data book includes setting the mobile phone in a search mode, generating a search mode character code corresponding to touch screen data input, determining whether the search mode character code is registered in said phone book storage and displaying a corresponding phone number if it is.

13 Claims, 7 Drawing Sheets

| NAME STORAGE REGION | | | | PHONE NUMBER STORAGE REGION | | | | | |
|---|---|---|---|---|---|---|---|---|---|
| JANG | KIL | SAN | | 1 | 2 | 3 | | | |
| HONG | KIL | DONG | | 0 | 2 | 3 | 7 | 8 | 9 |
| IM | KUK | JUNG | | 0 | 1 | 1 | 4 | 5 | |
| KIM | CHUL | SU | | 0 | 5 | 1 | | | |
| KIM | YOUNG | HEE | | 6 | 4 | 7 | | | |

FIG. 4

METHOD OF STORING DATA IN AND SEARCHING THROUGH AN ELECTRONIC PHONE NUMBER DATA BOOK IN A DIGITAL MOBILE PHONE WITH CHARACTER RECOGNITION FUNCTION

BACKGROUND OF THE INVENTION

1. Field of the Invention

The present invention relates to a digital mobile phone with a character recognition function, and more particularly to a method of storing data in and searching an electronic phone number data book in such a digital mobile phone.

2. Description of the Related Art

A digital mobile phone typically has an auxiliary function to enable the user to store and retrieve phone numbers into and from a memory device provided therein. An electronic phone number data book (hereinafter referred to simply as "phone book") is a term representing the memory used for this purpose. Hence, once the user has stored the phone numbers into the memory device of such a digital phone, he may retrieve a desired one of the phone numbers stored in the phone book from the memory device instead of inputting the phone number called. To this end, the input keys provided in the mobile phone have been conventionally used to input the names of persons and their respective phone numbers (user data) into the memory device. However, the number of input keys is limited due to the compactness of the mobile phone, making it difficult to quickly and easily input the information.

Therefore, a need exists for a method of quickly and easily storing and retrieving the names and phone numbers of persons stored in the memory of a mobile phone.

SUMMARY OF THE INVENTION

It is therefore an object of the present invention to provide an improved method of storing data in and searching through a phone book in a digital mobile phone with a character recognition function, which enables the user to quickly and easily store and retrieve the names and phone numbers of persons.

According to the present invention, a method of storing user data in a phone book in a digital mobile phone, which includes a key input part, display, touch screen for inputting characters, character code storage for storing character and number codes, character database for storing feature data corresponding to character and number codes, and character recognition device, comprises the steps of setting the mobile phone to a phone number registration mode, transferring touch screen data, generated by pressing the touch screen, to the character recognition device, generating the feature data corresponding to the touch screen data using the recognition device, identifying the feature data stored in the character database, retrieving the number code corresponding to the feature data from the character code storage, displaying the number corresponding to said number code and storing the number code in the phone number storage region of the phone book storage, repeating the first to fourth steps in response to a key input representing character code mode upon detecting no further touch screen data, retrieving the character code corresponding to the feature data from the character code storage, and displaying the character corresponding to said character code and storing the character code in the name storage region of the phone book storage, the character code being associated with the number code.

A method of retrieving said stored user data includes the steps of setting said mobile phone in a search mode, generating a search mode character code corresponding to search mode touch screen data inputted through said touch screen, determining whether the search mode character code is registered in said phone book storage, and displaying a corresponding phone number on said display when the search mode character code is registered in said phone book storage.

BRIEF DESCRIPTION OF THE DRAWINGS

The above and other objects, features, and advantages of the present invention will become more apparent in light of the following detailed description of an exemplary embodiment thereof taken in conjunction with the attached drawings, in which:

FIG. 4 illustrates the memory table for storing data in the electronic phone book.

DETAILED DESCRIPTION OF THE PREFERRED EMBODIMENT

Figure 1:
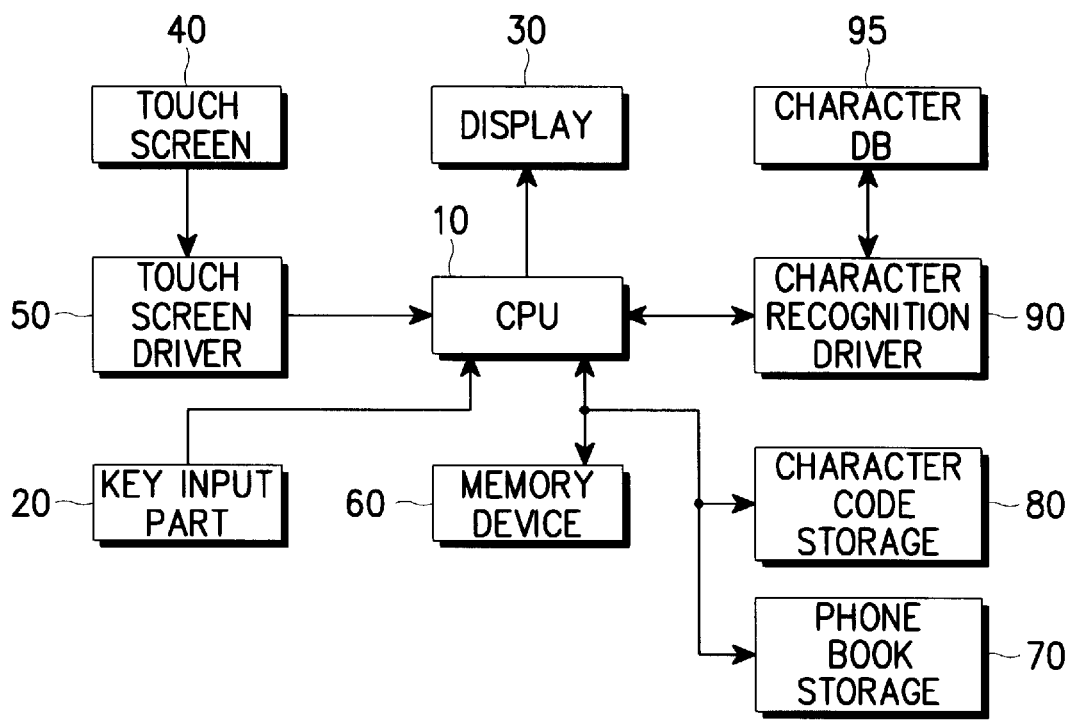
FIG. 1 is a block diagram illustrating the structure of a conventional digital mobile phone with a character recognition function.

Referring to FIG. 1, a digital mobile phone includes a CPU 10 for controlling the functions of the phone, a key input part 20 for generating key data applied to the CPU 10, and a touch screen 40 for generating the touch screen data representing the positions of the points pressed. The radio frequency part and dual tone multi-frequency part are commonly known in the art and are therefore omitted from the drawing for descriptive clarity. The touch screen 40 is an input means for inputting character data, and is made of a resistance panel or a capacitance panel, with characters being represented by a point pressed on the touch screen and detected by variations of resistance or capacitance, respectively. When a point is pressed on the touch screen 40, it generates a signal representing the X and Y coordinates of the point and a signal representing the number of strokes forming the character. The signal representing the X and Y coordinates produces coordinate data, and the signal representing the number of strokes produces state data to detect the number of impulses generated by pressing the touch screen. Hereinafter, the coordinate data and state data will be cumulatively referred to as touch screen data.

Also provided is a touch screen driver 50 including an analog/digital (A/D) converter to convert the analog coordinate and state signals into the digital touch screen data. The touch screen data is also called character feature data to determine a specific character. Hence, the state data of the character feature data represents the number of the strokes forming a character. For example, in order to recognize the character 'A', the state data is required to calculate the 3 strokes constituting the character 'A'. Of course, the recognition of a number may be achieved in the same way. The touch screen data is processed by the character recognition device 90 under the control of CPU 10 to generate the character feature data. The character recognition device 90 compares the feature data of the input character with the feature data stored in a character database 95, which comprises the coordinate data and state data of various characters, such as the Korean and English alphabets and numbers. If similar feature data is found in the character database 95 within a given error range, its address is transferred to CPU 10 to retrieve the corresponding character code stored in a character code storage 80, which stores the character codes corresponding to the feature data of the character database 95. The retrieved character code representing the character inputted through the touch screen 40 is displayed on the display 30.

Also provided is a memory device 60 comprising a volatile memory such as RAM and a non-volatile memory such as flash memory or EEPROM to store the control program for controlling the functions of the digital mobile phone, initial service data, and temporarily generated data. The display 30, preferably an LCD, is used to display the functional state of the phone and the characters and numbers inputted and retrieved through the touch screen 40 and character recognition device 90, under the control of CPU 10. The names of persons and their respective phone numbers are stored in a phone book storage 70, which comprises a phone number storage region for storing the phone numbers and a name storage region for storing the persons' names, as shown in FIG. 4. The phone number region consists of a plurality of number code elements each storing a number, and likewise, the name storage region consists of a plurality of character code elements each storing a character.

Figure 2A:
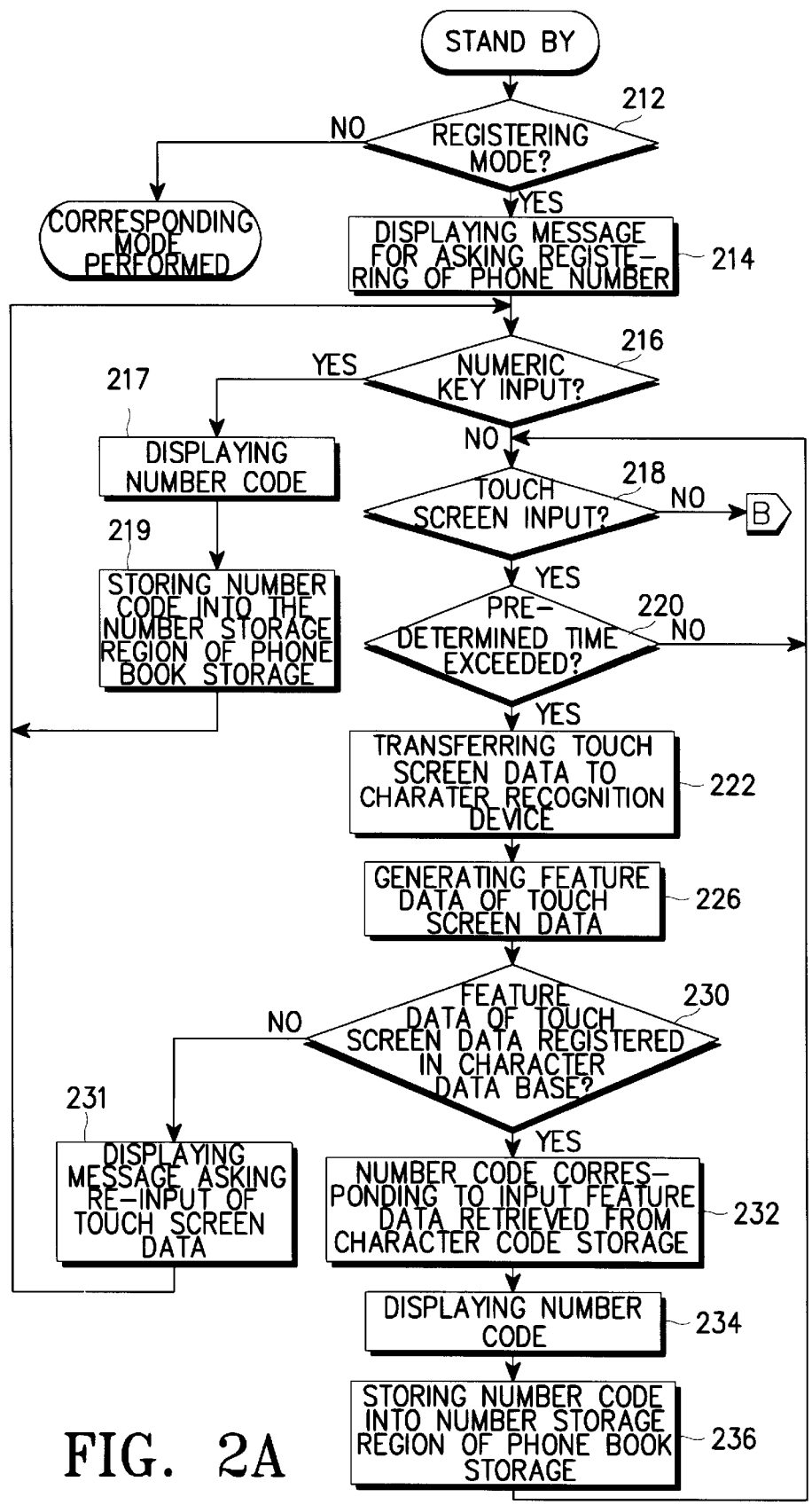
FIGS. 2A, 2B and 2C are flow charts for illustrating the process of storing data in the phone book in a digital mobile phone according to the present invention.
Figure 2B:
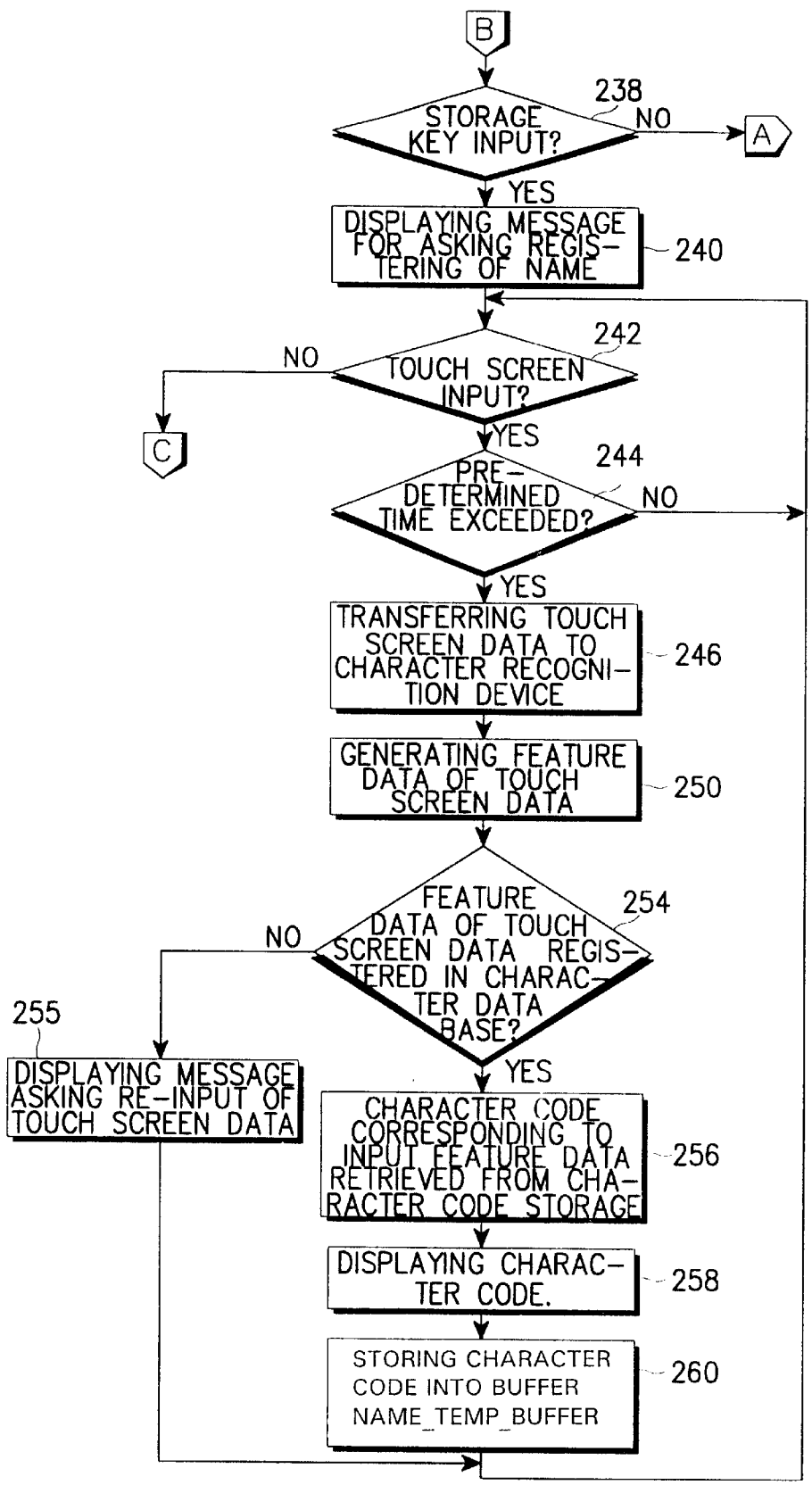
Figure 2C:
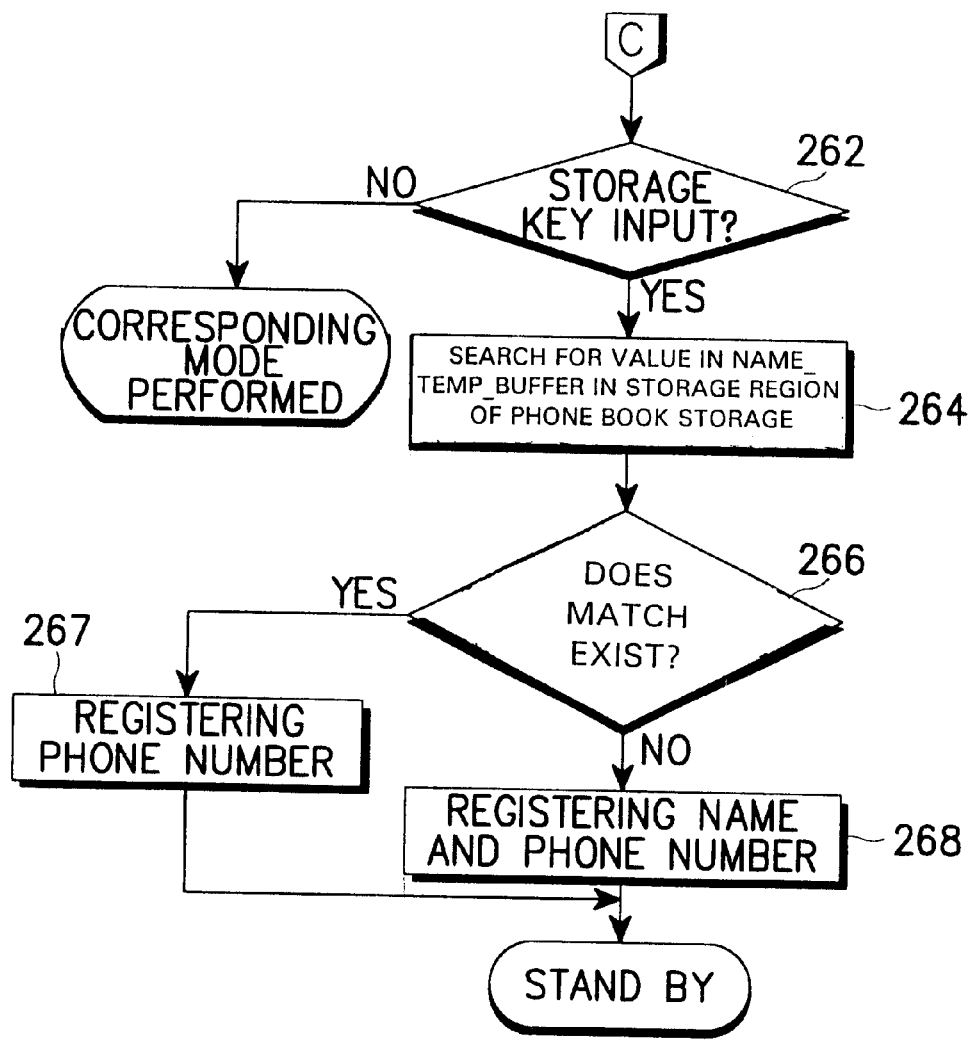

The process of storing data in the phone book in the digital mobile phone is shown in FIGS. 2A to 2C. If there is a key input to start the phone number registering mode in step 212, the display 30 displays a message for asking for the registering of a desired phone number in step 214. Then the user inputs the desired phone number by means of the numeric keys of the key input part 20 or the touch screen 40. In this case, the numeric key input is detected in step 216, and the touch screen input in step 218. When the numeric key input is not detected in step 216, CPU 10 determines whether a pressure variation is generated which is caused by 10 pressing the touch screen 40 in step 218. Detecting the pressure variation in step 218, it is determined in step 220 whether a predetermined time is exceeded. The predetermined time is to determine the completion of inputting an individual number. If the predetermined time is exceeded, the touch screen data of the input number is transferred to the character recognition device 90 in step 222. Then the character recognition device 90 generates the feature data of the touch screen data in step 226.

As described above, the feature data includes the X/Y coordinate data and the number of strokes to identify the inputted number. The character database 95 is searched in step 230 to compare the feature data generated in step 226 with the feature data stored in the character database 95. If the feature data of the touch screen data is found in the character database in step 230, a number code corresponding to the input feature data is retrieved from the character code storage 80 in step 232. The number corresponding to the retrieved number code is displayed on the display 30 in step 234 and stored in the first number code element of the number storage region of the phone book storage 70 in step 236. Thereafter, the process returns to step 218 to detect another touch screen input for the next number of the phone number. However, in step 230, if the feature data of the touch screen data is not found in the character database 95, the process goes to step 231 to display a message asking for a re-input of the number on the display 30, then repeating step 216. This may be caused by user error when inputting the number. On the other hand, if a numeric key is inputted in step 216, the process goes to step 217 to display the corresponding number code, directly storing the number code into the number storage region of the phone book storage in step 219, thus, completing the input of the phone number.

Turning now to FIG. 2B, the process of registering the phone number is ended by pressing the storage key in step 238, in lieu of entering touch screen data in step 216.

Subsequently, in step 240, a message is displayed on the display 30 asking for input of the name corresponding to the registered phone number. In step 242, it is determined whether the touch screen 40 is pressed to input the name. If there is a touch screen input, it is determined in step 244 whether a predetermined time is exceeded. This is to determine the completion of a character input. Exceeding the predetermined time, the touch screen data is transferred to the character recognition device 90 in step 246. Then, the character recognition device 90 generates the corresponding feature data in step 250. In this case, the feature data identifies the input character. The character database 95 is searched in step 254 to find the generated feature data therefrom. If the feature data is found, the character code corresponding to the input feature data is retrieved from the character code storage 80 in step 256. Finally, the character corresponding to said character code is displayed on the display 30 in step 258 and stored into a buffer Name__Temp__Buffer of the phone book storage 70 in step 260.

Then, the process returns to step 242 to detect another character input through the touch screen 40. However, in step 254 if the feature data is not found in the character database 95, a message is displayed on the display 30 asking for re-input of the character in step 255, returning to step 242. This may be caused by user error during the input operation. However, if no further character input is detected through the touch screen 40 in step 242, and the storage key is inputted in step 262 of FIG. 2C, the process goes to step 264 to search the buffer Name__Temp__Buffer of the phone book storage 70. Then, in step 266, it is determined whether the value in Name__Temp__Buffer matches a name in the name storage region. If the value does not match a name in the name storage region, an empty storage region is provided into where the name and phone number may be stored in step 268. However, upon detecting a match in step 266, a revision of the phone, number is presumed, thus registering only the phone number in step 267.

Figure 3A:
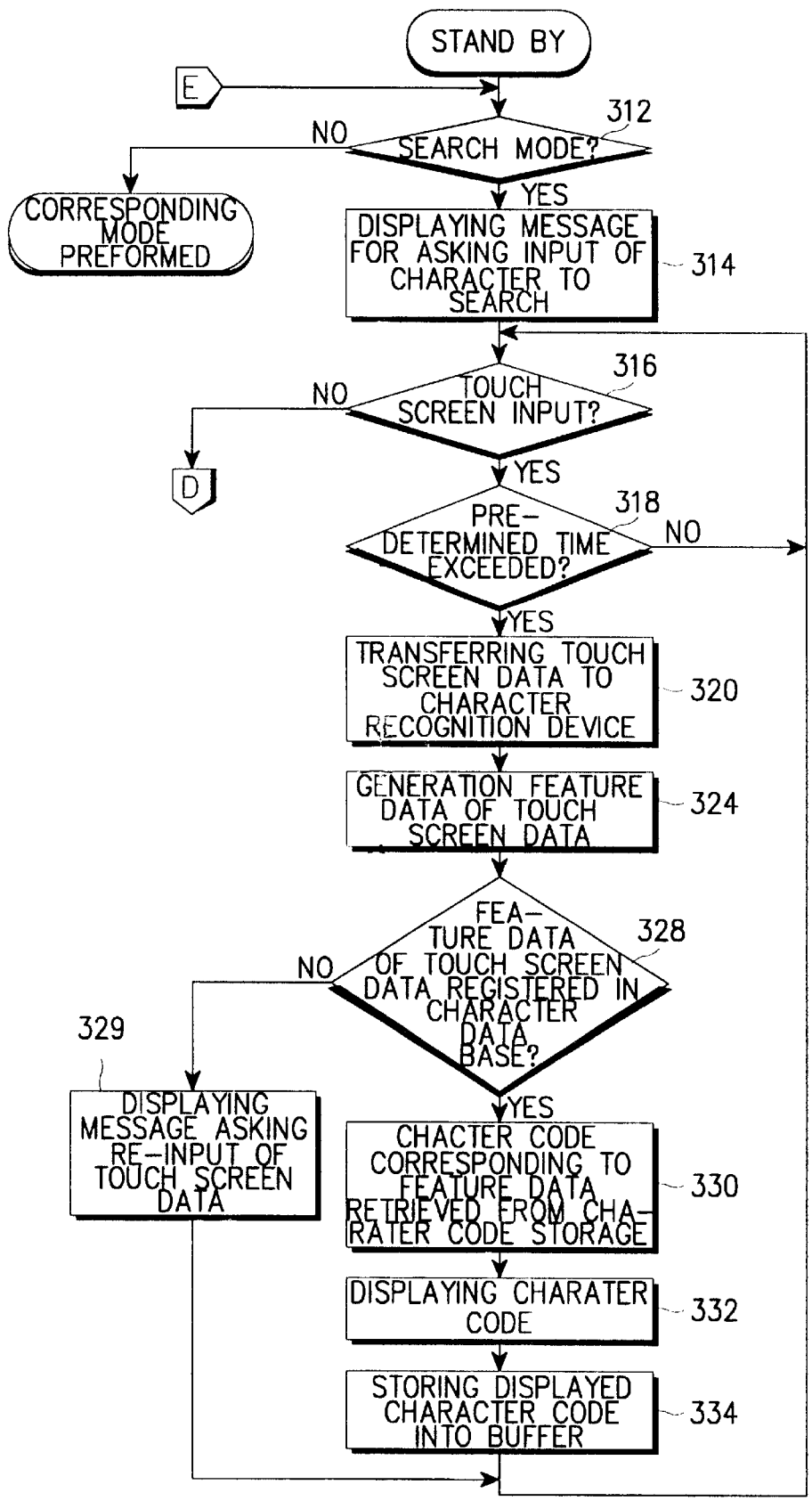
FIGS. 3A and 3B are flow charts illustrating the process of searching through the electronic phone book in accordance with the present invention.
Figure 3B:
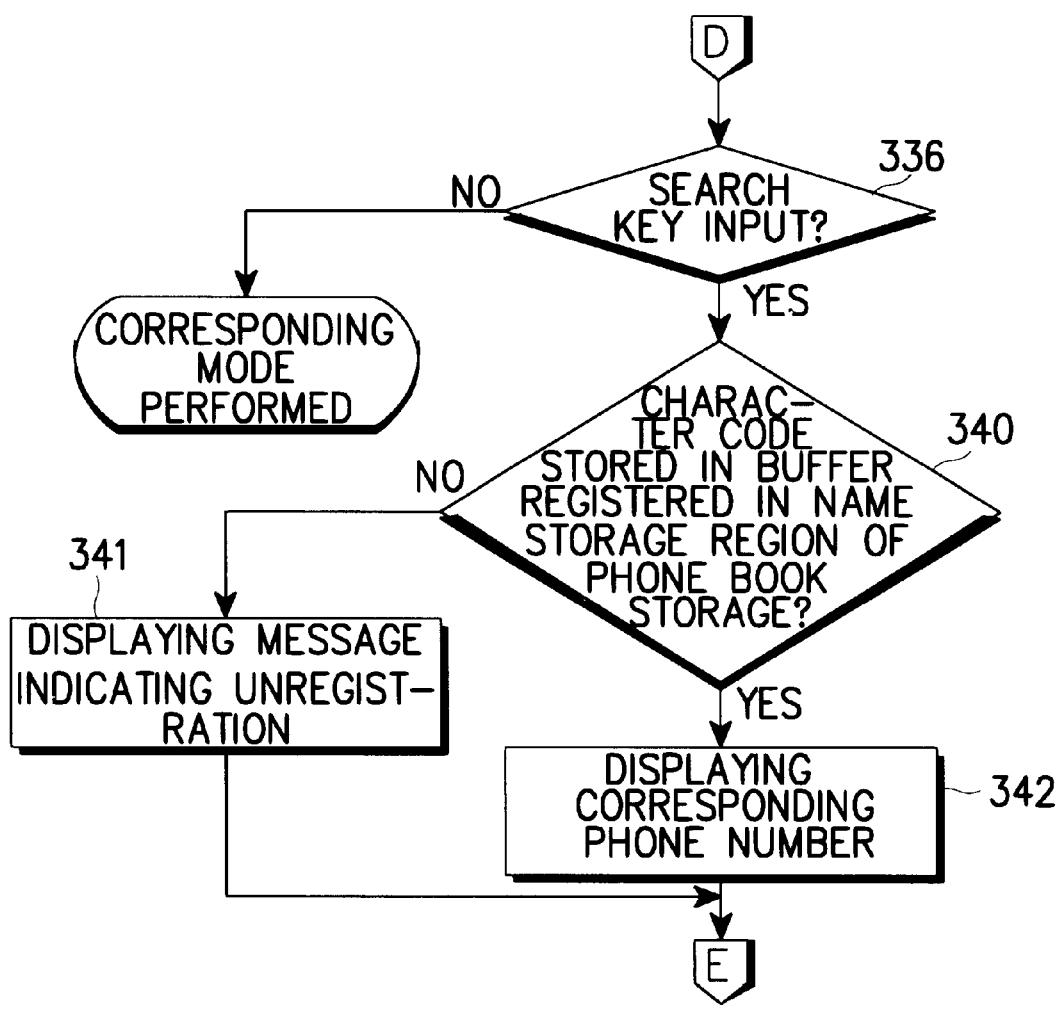

Referring to FIGS. 3A and 3B, the process of retrieving a phone number from the phone book is described. If it is determined that a key is input to perform the search mode in step 312, a message is displayed on the display 30 asking for input of a character to search in step 314. Then, CPU 10 determines in step 316 whether there is a pressure variation inputted through the touch screen 40. Detecting the pressure variation, it is determined in step 318 whether a predetermined time is exceeded. The predetermined time is to determine the completion of a character input. After the predetermined time expires, the touch screen data is transferred to the character recognition device 90 in step 320. Then, the character recognition device 90 generates the feature data of the screen data in step 324. It is determined in step 328 whether the feature data generated in step 324 matches the feature data registered in the character database 95. If the corresponding feature data is registered in the character database 95, the character code corresponding to the feature data is retrieved from the character code storage 80 in step 330. The character corresponding to said retrieved character code is displayed on the display 30 in step 332, and stored into a buffer in step 334. The buffer is included in the memory device 60.

Then, the process returns to step 316 to detect another character inputted through the touch screen 40. However, if the corresponding feature data is not registered in the character database 95 in step 328, a message is displayed on the display asking re-input of the character in step 329, thereby returning to step 316. Meanwhile, if there is no further input through the touch screen 40 in step 316, and the search key is inputted in step 336 of FIG. 3B, it is determined in step 340 whether the character code stored in the buffer in step 334 is registered in the name storage region of the phone book storage 70. If so, the phone number corresponding to the character code is displayed in step 342, then returning to step 310. However, if the character code is not registered in the name storage region, a message is displayed indicating lack of registration in step 341, then repeating step 310. Of course, the phone book may be programmed so that input of a single character suffices for retrieving a desired phone number or name.

Although the present embodiment describes the phone number inputted prior to the name, the converse is also possible.

As described above, the present invention provides a digital mobile phone with means of easily storing data in the electronic phone book by employing the touch screen. While the present invention has been described with specific embodiments as accompanied by the attached drawings, it will be appreciated by those skilled in the art that various changes and modifications may be made thereto without departing from the scope of the present invention as defined by the appended claims.

What is claimed is:

1. A method of storing data in an electronic phone number data book (phone book) in a digital mobile phone with a character recognition device, which includes a display, a touch screen for inputting characters and a phone book storage, comprising the steps of:

setting said mobile phone to a phone book storage mode;

generating a character code corresponding to touch screen data inputted through said touch screen;

generating a number code corresponding to touch screen data inputted through said touch screen, said character code representing a name associated with said number code; and storing said character and number codes into said phone book storage upon detecting no further touch screen data, wherein said touch screen data comprises coordinate data representing the X/Y coordinates of a point pressed on said touch screen to input a character or number, and state data identifying said character or number by calculating the number of successive impulses pressed on said touch screen.

2. The method as recited in claim 1, wherein said state data represents the number of corresponding strokes of said character or number.

3. The method recited in claim 1, wherein the step of generating the character code is repeated if there is a further touch screen input within a predetermined time.

4. The method recited in claim 1, wherein the step of generating the number code is repeated if there is a further touch screen input within a predetermined time.

5. The method of storing data in an electronic phone number data book (phone book) in a digital mobile phone with a character recognition device, which includes a display, a touch screen for inputting characters and a phone book storage, comprising the steps of:

setting said mobile phone to a phone book storage mode;

generating a character code corresponding to touch screen data inputted through said touch screen;

generating a number code corresponding to touch screen data inputted through said touch screen, said character code representing a name associated with said number code;

storing said character and number codes into said phone book storage upon detecting no further touch screen data;

setting said mobile phone in a search mode;

generating a search mode character code corresponding to search mode touch screen data inputted through said touch screen;

determining whether the search mode character code is registered in said phone book storage; and displaying a corresponding phone number on said display when the search mode character code is registered in said phone book storage.

6. The method recited in claim 5, comprising the further step of displaying a message on said display indicating that said search mode character code is not registered in said phone book storage, when same is true.

7. In a digital mobile phone, which includes a key input part, a display, a touch screen for inputting characters, a phone book storage area, a character code storage; for storing character and number codes, a character database for storing feature data corresponding to character and number codes, and a character recognition device, a method of storing data in an electronic phone book in said digital mobile phone, comprising the steps of:

setting said mobile phone to phone number registration mode;

transferring touch screen data generated by pressing said touch screen to said character recognition device;

generating feature data corresponding to said touch screen data by said recognition device;

identifying matching feature data stored in said character database;

retrieving a number code corresponding to said matching feature data from said character code storage;

displaying a number corresponding to said number code and storing said number code into a phone number storage region of said phone book storage;

repeating the first to fourth steps in response to a key input representing a character code mode upon detecting no further touch screen data;

retrieving the character code corresponding to the feature data from said character code storage; and displaying the character corresponding to said character code and storing said character code into the name storage region of said phone book storage, said character code being associated with said number code.

8. The method recited in claim 7, wherein said touch screen data comprises coordinate data representing the X/Y coordinates of a point pressed on said touch screen to input a character or number, and state data identifying said character or number by calculating the number of successive impulses pressed on said touch screen.

9. The method recited in claim 7, comprising the further steps of:

setting said mobile phone in a search mode;

generating a search mode character code corresponding to search mode touch screen data inputted through said touch screen;

determining whether the search mode character code is registered in said phone book storage; and displaying a corresponding phone number on said display when the search mode character code is registered in said phone book storage.

10. The method recited in claim 8, comprising the further step of displaying a message on said display indicating that said search mode character code is not registered in said phone book storage, when same is true.

11. The method recited in claim 7, wherein said feature data comprises a coordinate data representing the coordinates of the character or number inputted by pressing said touch screen, and stroke data representing the number of corresponding strokes of said character or number.

12. The method recited in claim 7, further including the step of displaying a message asking re-input of said touch screen if the generated feature data is not registered in said character database.

13. The method recited in claim 7, further including the step of repeating the first to sixth steps upon detecting another touch screen input after performing the sixth step.

* * * * *

UNITED STATES PATENT AND TRADEMARK OFFICE
CERTIFICATE OF CORRECTION

PATENT NO. : 6,510,235 B1
DATED : February 21, 2006
INVENTOR(S) : Shin, Jang-Ki and Park, Joung-Kyou It is certified that error appears in the above-identified patent and that said Letters Patent is hereby corrected as shown below:

Column 6,
Line 51, delete "first" and replace with -- second --.

Column 8,
Line 11, delete "first" and replace with -- second --.

Signed and Sealed this

Twenty-fifth Day of April, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,510,235 B1 | Page 1 of 1 |
| APPLICATION NO. | : 09/420271 | |
| DATED | : January 21, 2003 | |
| INVENTOR(S) | : Shin, Jang-Ki and Park, Joung-Kyou | |

It is certified that error appears in the above-identified patent and that said Letters Patent is hereby corrected as shown below:

Column 6,
Line 51, delete "first" and replace with -- second --.

Column 8,
Line 11, delete "first" and replace with -- second --.

This certificate supersedes Certificate of Correction issued April 25, 2006.

Signed and Sealed this

Eighth Day of August, 2006

JON W. DUDAS
*Director of the United States Patent and Trademark Office*